US006950428B1

(12) United States Patent
Horst et al.

(10) Patent No.: US 6,950,428 B1
(45) Date of Patent: Sep. 27, 2005

(54) SYSTEM AND METHOD FOR CONFIGURING ADAPTIVE SETS OF LINKS BETWEEN ROUTERS IN A SYSTEM AREA NETWORK (SAN)

(75) Inventors: Robert W. Horst, Saratoga, CA (US); William J. Watson, Austin, TX (US); David A. Brown, Austin, TX (US); David J. Garcia, Los Gatos, CA (US); William P. Bunton, Pflugerville, TX (US); David T. Heron, Austin, TX (US); William F. Bruckert, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1062 days.

(21) Appl. No.: 09/670,174

(22) Filed: Sep. 25, 2000

Related U.S. Application Data

(63) Continuation-in-part of application No. 09/224,114, filed on Dec. 30, 1998, now Pat. No. 6,493,343, and a continuation-in-part of application No. 09/228,069, filed on Dec. 30, 1998, now Pat. No. 6,163,834.

(51) Int. Cl.[7] .................................................. H04J 1/16
(52) U.S. Cl. ...................................................... 370/389

(58) Field of Search ................................ 370/389, 401, 370/402, 403, 351, 352, 465, 360, 356, 357, 370/361, 367, 369, 370, 376, 387, 388, 390, 370/394, 395.1, 399

(56) References Cited

U.S. PATENT DOCUMENTS

| | | | |
|---|---|---|---|
| 5,208,810 A | 5/1993 | Park | 370/94.1 |
| 5,268,900 A | 12/1993 | Hluchyj et al. | 370/94.1 |
| 5,557,751 A | 9/1996 | Banman et al. | 395/250 |
| 5,574,849 A | 11/1996 | Sonnier et al. | 395/182.1 |
| 5,675,579 A | 10/1997 | Watson et al. | 370/248 |
| 5,694,121 A | 12/1997 | Karuse et al. | 340/825.5 |
| 5,710,549 A | 1/1998 | Horst et al. | 340/825.5 |
| 5,867,501 A | 2/1999 | Horst et al. | 370/474 |
| 6,721,316 B1 * | 4/2004 | Epps et al. | 370/389 |
| 6,778,546 B1 * | 8/2004 | Epps et al. | 370/413 |

* cited by examiner

*Primary Examiner*—Dang T. Ton

(57) ABSTRACT

Adaptive sets of lanes are configured between routers in a system area network. Source nodes determine whether packets may be adaptively routed between the lanes by encoding adaptive control bits in the packet header. The adaptive control bits also facilitate the flushing of all lanes of the adaptive set. Adaptive sets may also be used in uplinks between levels of a fat tree.

7 Claims, 6 Drawing Sheets

| TABLE 2 PHYSICAL LINK TRANSLATION INTO PHYSICAL LANE | | | | |
|---|---|---|---|---|
| FAT PIPE | PHYSICAL LANE 0 | PHYSICAL LANE 1 | PHYSICAL LANE 2 | PHYSICAL LANE 3 |
| 0 | 1 | 6 | 9 | |
| 1 | 5 | 7 | 8 | 11 |

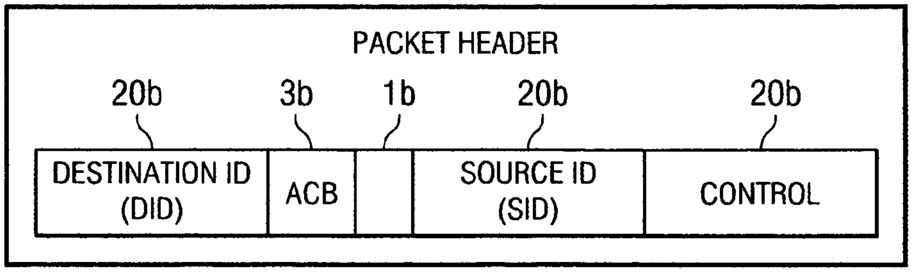

*FIG. 7*

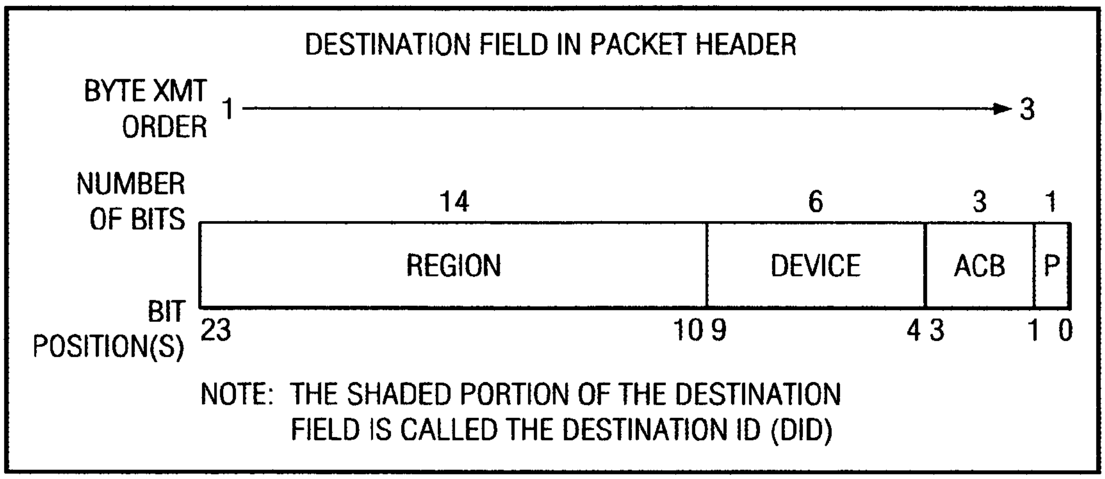

*FIG. 8*

| ADAPTIVE CONTROL BITS (ACB) ENCODING DEFINITION | |
|---|---|
| ENCODING | DEFINITION |
| 000 | ORDERED PACKET DELIVERY TO LANE 0 IF ROUTED TO A PORT IN AN ADAPTIVE SET |
| 001 | ORDERED PACKET DELIVERY TO LANE 1 IF ROUTED TO A PORT IN AN ADAPTIVE SET |
| 010 | ORDERED PACKET DELIVERY TO LANE 2 IF ROUTED TO A PORT IN AN ADAPTIVE SET |
| 011 | ORDERED PACKET DELIVERY TO LANE 3 IF ROUTED TO A PORT IN AN ADAPTIVE SET |
| 100 | UNORDERED PACKET DELIVERY TO LANE DETERMINED BY ADAPTIVE SET LOGIC |
| 101-111 | RESERVED (LOGIC IN ROUTER-II TREATS THIS THE SAME AS THE 100 ENCODING) |

*FIG. 9*

SYSTEM AND METHOD FOR CONFIGURING ADAPTIVE SETS OF LINKS BETWEEN ROUTERS IN A SYSTEM AREA NETWORK (SAN)

CROSS-REFERENCES TO RELATED APPLICATIONS

This application is a continuation-in-part of application Ser. No. 09/224,114 filed Dec. 30, 1998 (U.S. Pat. No. 6,493,343 issued Dec. 10, 2002) and Ser. No. 09/228,069, filed Dec. 30, 1998, (U.S. Pat. No. 6,163,834 issued Dec. 19, 2000) the disclosures of which are incorporated herein by reference.

BACKGROUND OF THE INVENTION

A System Area Network (SAN) is used to interconnect nodes within a distributed computer system, such as a cluster. The SAN is a type of network that provides high bandwidth, low latency communication with a very low error rate. SANs often utilize fault-tolerant technology to assure high availability. The performance of a SAN resembles a memory subsystem more than a traditional local area network (LAN).

The preferred embodiments will be described implemented in the ServerNet architecture, manufactured by the assignee of the present invention, which is a layered transport protocol for a System Area Network (SAN). The ServerNet II protocol layers for an end node and for a routing node are illustrated in FIG. 1. A single session layer may support one or two ports, each with its associated transaction, packet, link-level, MAC (media access) and physical layer. Similarly, routing nodes with a common routing layer may support multiple ports, each with its associated link-level, MAC and physical layer.

Support for two ports enables ServerNet SAN to be configured in both non-redundant and redundant (fault tolerant, or FT) SAN configurations as illustrated in FIG. 2 and FIG. 3. On a fault tolerant network, a port of each end node may be connected to each network to provide continued message communication in the event of failure of one of the SANs. In the fault tolerant SAN, nodes may be also ported into a single fabric or single ported end nodes may be grouped into pairs to provide duplex FT controllers. The fabric is the collection of routers, switches, connectors, and cables that connects the nodes in a network.

The SAN includes end nodes and routing nodes connected by physical links. Each node may be an end node which generates and consumes data packets. Routing nodes never generate or consume data packets but simply pass the packets along from the source end node to the destination end node.

Each node includes bidirectional ports connected to the physical link. A link layer protocol (LLP) manages the flow of status and packet data between ports on independent nodes.

The ServerNet SAN has been enhanced to improve performance. The original ServerNet configuration is designated SNet I and the improved configuration is designated SNet II. Among the improvements implemented in SNet II SAN is a higher transfer rate and different symbol encoding. Links between SNet II endnodes have a data transfer rate of 125 MB/s. Future CPUs and I/O devices will require much faster data transfer rates. However, to significantly increase the link transfer rate would require discontinuing use of low-cost commoditiy serial links such as the 1.25 Gbit serial links common to Ethernet.

SUMMARY OF THE INVENTION

According to one aspect of the invention, an adaptive set is a plurality of physical links connecting a pair of routers. The multiple links of the adaptive set are called lanes. The router includes logic for adaptively routing packets received at an input port to the various lanes. A source end node controls whether packets destined for the router are routed deterministically or adaptively by encoding control bits in the packet header. The adaptive set configuration allows the use of commodity serial links while allowing for unusual bandwidth needs and future scalability.

According to another aspect of the invention, the control bits may specify that a packet be routed through a particular lane in an adaptive set.

According to another aspect of the invention, all lanes of an adaptive set can be flushed by encoding the control bits in flush packets to sequentially flush all lanes of the adaptive set.

According to a still further aspect of the invention, the number of lanes that can be included in an adaptive set is limited to a particular number. During a flush, packets sequence through the particular number of lanes.

According to a still further aspect of the invention, uplinks from a particular router in a lower level of a fat tree topology are configured as an adaptive set. These links are coupled to different routers in an upper layer so that packets are distributed adaptively from a particular router in the lower level to multiple routers in the upper layer.

Additional advantages and features of the invention will be apparent in view of the following detailed description and appended drawings.

BRIEF DESCRIPTION OF THE DRAWINGS

FIG. 7 is a block diagram depicting the contents of a packet header;

FIG. 8 is a block diagram depicting the contents of the destination field;

FIG. 9 is a table defining the encoding of the adaptive control bits (ACB);

DESCRIPTION OF THE SPECIFIC EMBODIMENTS

A preferred embodiment of the invention will now be described in the context of the ServerNet (SNet) system area network (SAN). SNet I and SNet II are scalable networks that support read, write, and interrupt semantics similar to previous generations I/O busses and are manufactured and distributed by the assignee of the present invention. The ServerNet I system is described in U.S. Pat. No. 5,675,807 which is assigned to the assignee of the present application.

Communication between nodes coupled to ServerNet is implemented by forming and transmitting packetized messages that are routed from the transmitting, or source node, to a destination node by a system area network structure comprising a number of router elements that are interconnected by a bus structure of a plurality of interconnecting links. The router elements are responsible for choosing the proper or available communication paths from a transmitting component of the processing system to a destination component based upon information contained in the message packet.

A router is an intelligent hub that routes traffic to a designated channel. In a ServerNet SAN, the router is a twelve-way crossbar switch that interconnects all of the ServerNet system components (processors, storage, and communications) for unobstructed, high-speed data passing. Each link between routers has a maximum bandwidth determined by the width of the link and the rate of data transfer. Bandwidth may be increased by configuring multiple links between routers as a link set or "Adaptive Set". Transfers that do not require strict ordering of packets may route the packet along any available lane of the Adaptive Set.

Configuring multiple links to be part of an Adaptive Set allows for higher bandwidth with little change to ServerNet hardware. At the router, a packet has to decide which link of a Adaptive Set to use.

Figure 1:
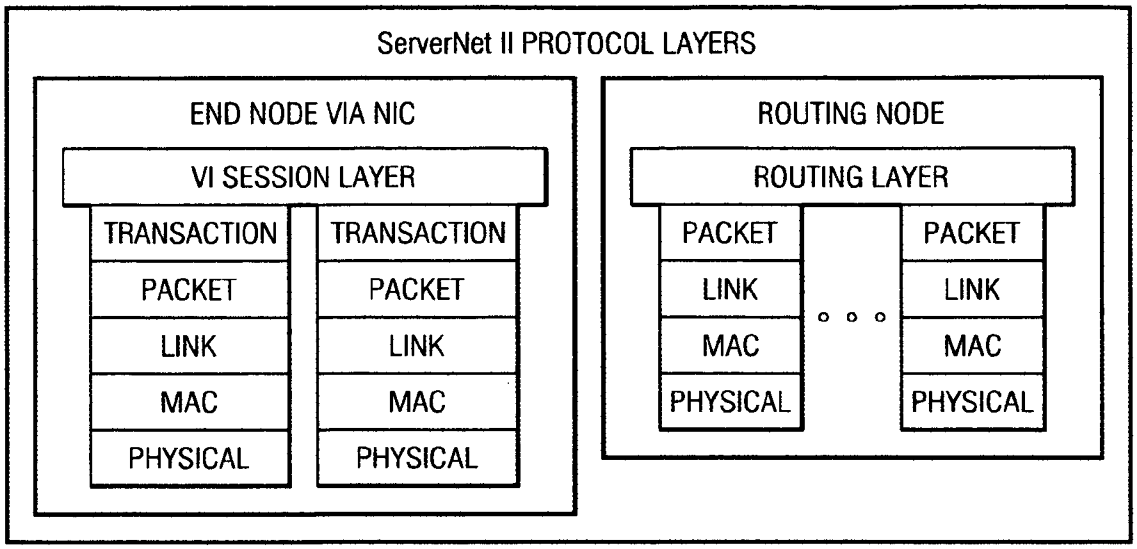
FIG. 1 is a block diagram depicting ServerNet protocol layers implemented by hardware, where ServerNet is a SAN manufactured by the assignee of the present invention.
Figure 2:
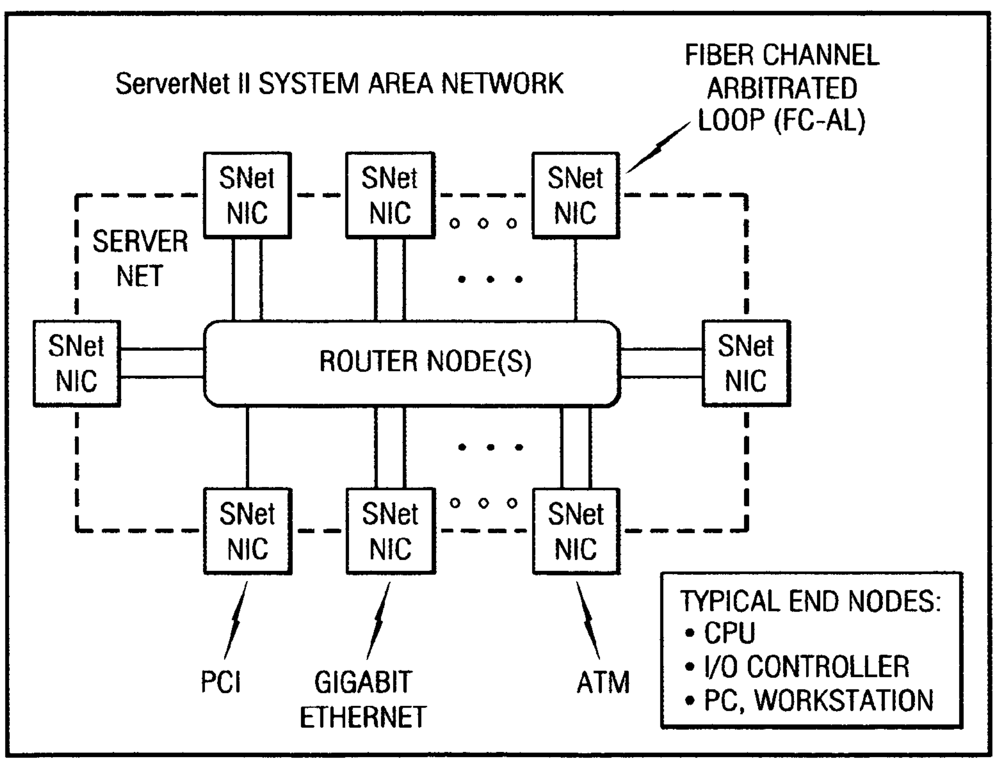
FIGS. 2 and 3 are block diagrams depicting SAN topologies.
Figure 3:
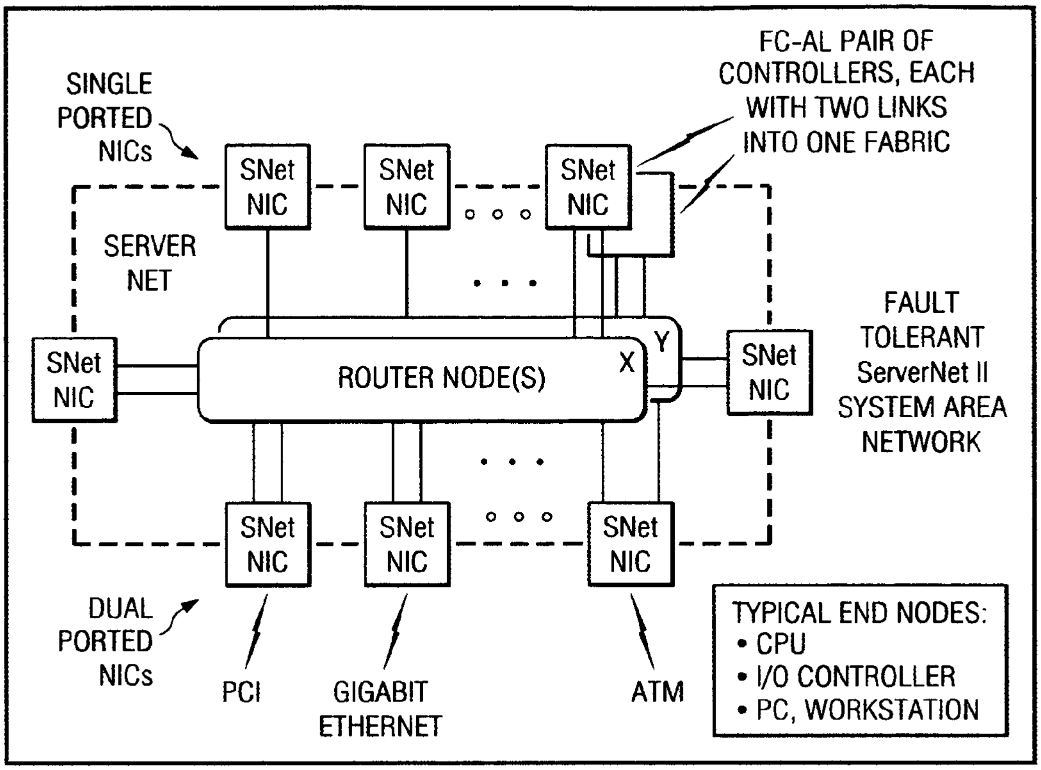
Figure 4:
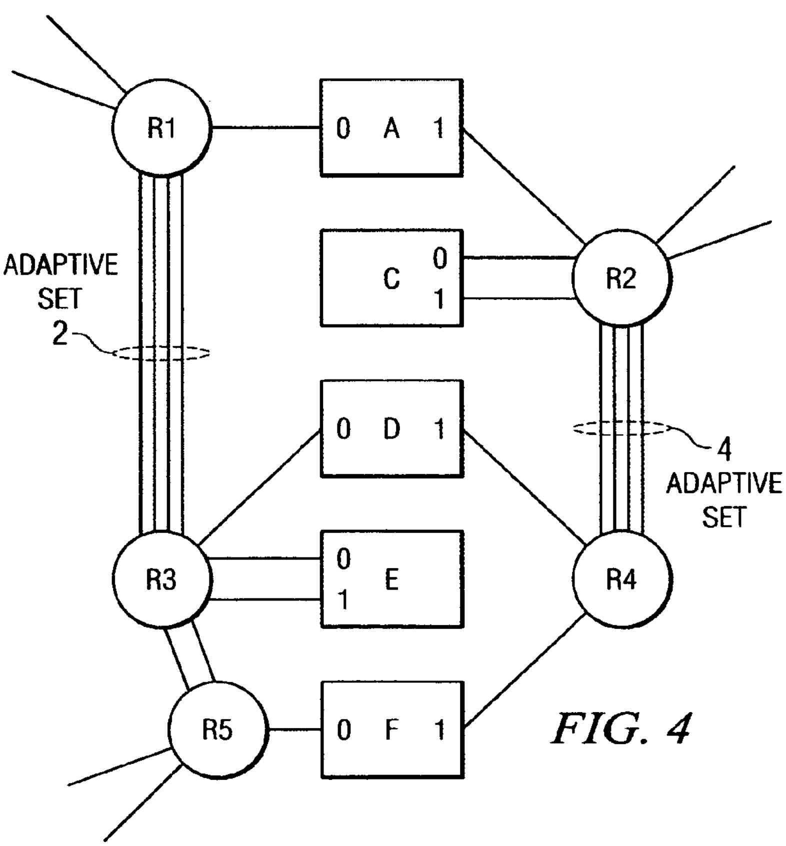
FIG. 4 is a schematic diagram depicting routers and links connecting SAN end nodes.

FIG. 4 depicts a network topology utilizing routers and links. In FIG. 4, end nodes A–F, each having first and second send/receive ports 0 and 1, are coupled by a ServerNet topology including routers R1–R4. Links are represented by lines coupling ports to routers or routers to routers. A first Adaptive Set 2 couples routers R1 and R3 and a second Adaptive Set 4 couples routers R2 and R4.

Thus, port 0 of end node A, port 0 of end node D, ports 0 and 1 of end node E, and port 0 of end node F may transfer data through the first Adaptive Set 2.

Figures 5, 6:
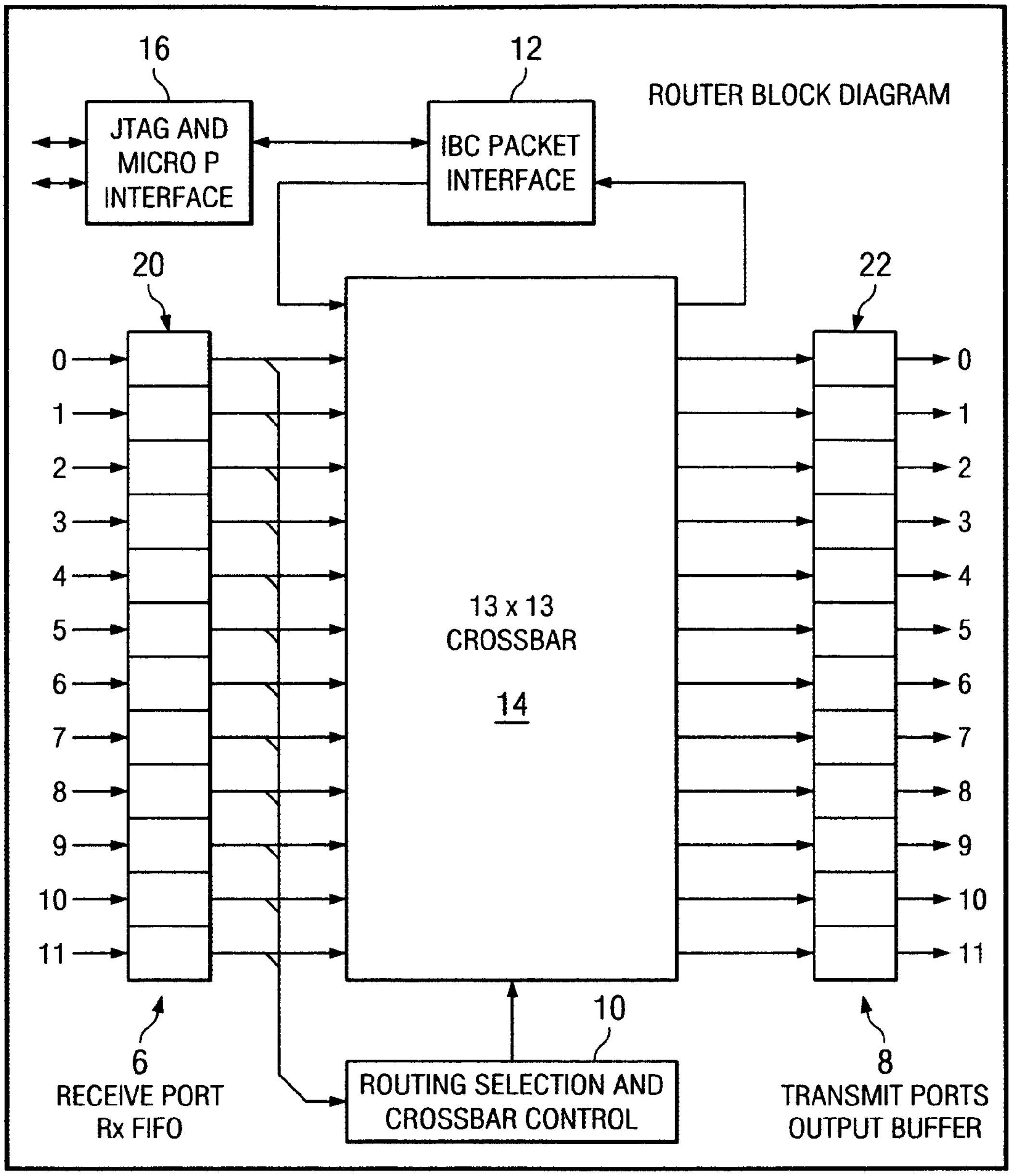
FIG. 5 is a block diagram of a router.
FIG. 6 is a physical link into physical lane translation table.

FIG. 5 is a block diagram of a router chip having twelve fully independent input ports 6, each with an associated output port 8, a routing control block 10, a simple packet interface for use with inband control messages 12, a fully non-blocking 13×13 crossbar 14, an interface for JTAG test and microcontroller connections 16.

Each input module includes receive data synchronizers, elastic FIFOs 20 and 22, and flow control logic. Each input module passes the header information to routing module, which determines the appropriate target port for the packet. The routing module also controls the selection of links in any Adaptive Sets as will be described more fully below.

Router Configuration

A router includes routing and configuration logic to route an incoming packet to the correct output port and to configure Adaptive Sets. The routing logic includes a routing table having 1024 entries each including a 4-bit port or Adaptive Set specifier and a bit to tell-if the entry is for a Adaptive Set.

As described above, in a preferred embodiment each router has 12 ports. The following is the currently preferred Adaptive Set implementation restrictions:

- The maximum number of physical links in a Adaptive Set is 4.
- There are 6 Adaptive Sets (maximum) that can be used (2 ports minimum per Adaptive Set).
- A port can be in a maximum of one Adaptive Set (a port can not be part of two Adaptive Sets).
- There are no restrictions to what ports can be in a given Adaptive Set—any physical port can be included in any one Adaptive Set.

Adaptive Set

Logically, a Adaptive Set is composed of a plurality of lanes. Adaptive Set configuration registers are used to translate the lane to a physical link.

FIG. 6 is a table illustrating the definition of two Adaptive Sets in a router conforming to the above-listed restrictions. Adaptive Set 0 is defined to be composed of three ports: 1, 6, and 9 and Adaptive Set 1 is defined to be composed of four ports: 5, 7, 8, and 11. FIG. 6 shows the two Adaptive Sets, the physical links that compose the Adaptive SetAdaptive Sets, and simple mapping of a Adaptive Setlane number into a given link of an Adaptive Set.

Packet Routing

As depicted in FIG. 7, each packet includes a header containing three fields which specify the destination of the packet (including routing information), the source of the packet (including packet type information), and control information.

FIG. 8 depicts the contents of the destination field. The region and device bits are used to access the routing table and determine the correct output port for a received packet. The ACB (adaptive control bits) are used to alert the Adaptive Set logic on the router whether the packet could use the adaptive routing capabilities of the Adaptive Set or if the packet should be routed down a specific lane of the Adaptive Set.

The encoding of the ACB bits is depicted in FIG. 9. Note that the first four encodings specify ordered packet delivery so that a specified lane of the Adaptive Set is utilized and the adaptive routing capability is not utilized. The ordering of packets sent from a specific source to a specific destination cannot be assured if adaptive routing is used.

Figure 10:
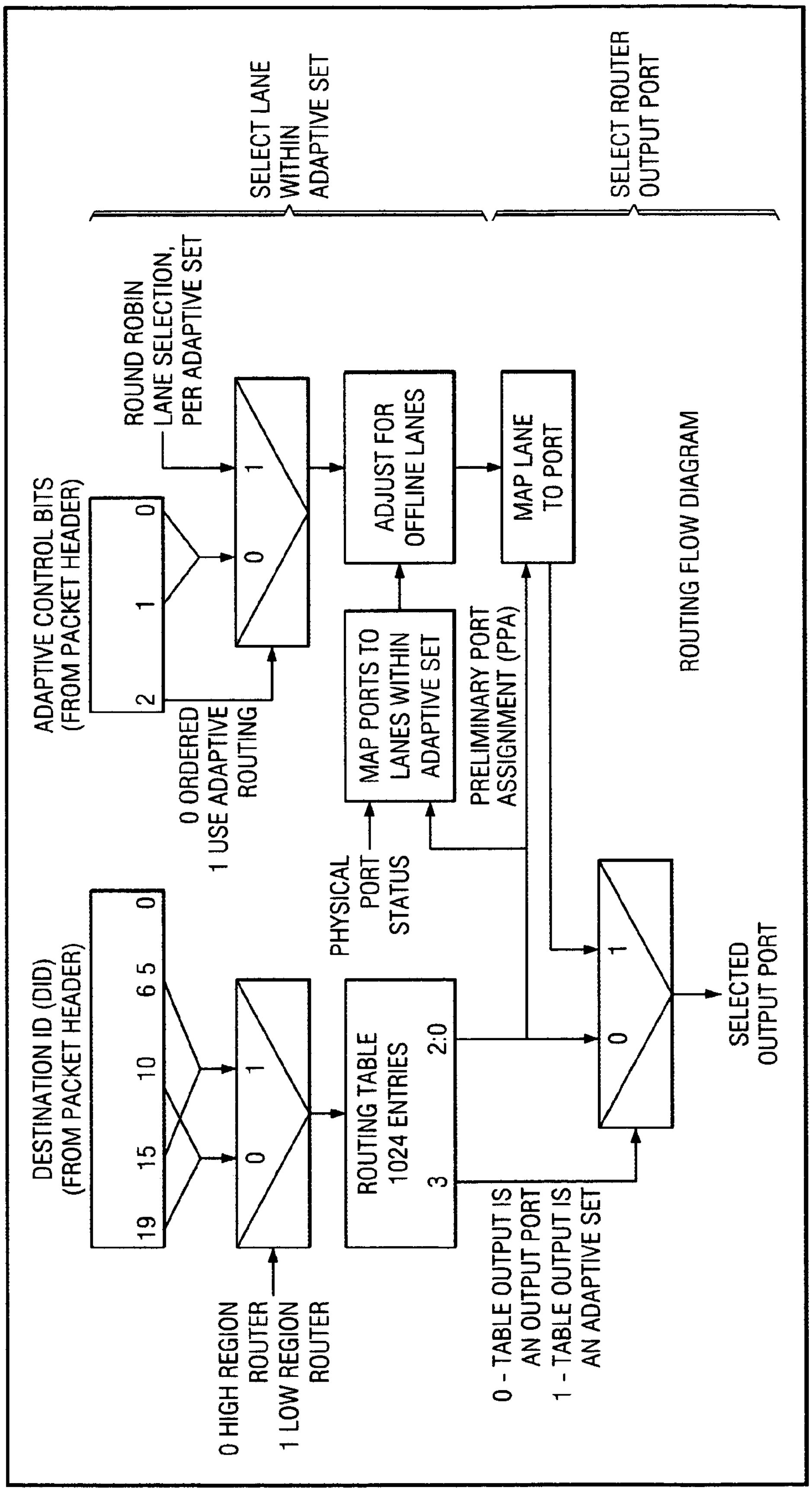
FIG. 10 is a flow chart of link to lane translation and back again.

When a packet enters the router, it flows through a routing flow diagram (RFD) as depicted in FIG. 10. The Routing Flow Diagram shows the mechanism by which the router determines which output port the incoming packet is delivered to. The routing decision is based primarily on the incoming packet's Destination ID (DID) field and if the output port is an adaptive set, the ACB filed also. The appropriate bits of the DID index the routing table. The table output determines the output port for the packet if an adaptive set of physical links is not used. If an adaptive set is used, other logic determines the appropriate lane of the adaptive set to use. When a packet is received the RFD designates a preliminary port assignment (PPA) for the packet. If there were no Adaptive Set the packet would be routed to the PPA. The router determines if the PPA is part of a Adaptive Set by comparing it with the static Adaptive Set definition (e.g., FIG. 6). If the PPA is part of a Adaptive Set then the PPA, which contains a physical link number, it is translated into a physical lane number of a particular Adaptive Set.

If the PPA is part of a Adaptive Set, then the ACB field is examined to determine whether ordered packet delivery is specified. If so, the ACB field specifies the offset value added to the lane number of the PPA to determine on which lane of the Adaptive Set the packet should be routed. The router then checks to determine whether the lane selected is on-line and finally converts from a lane number of a particular Adaptive Set to a physical link of the router.

If one of the physical links of a Adaptive Set becomes unavailable due to being taken off-line through link-level protocol errors, the Adaptive Set will reconfigure itself so that the lost link is not used as part of the Adaptive Set until the link comes back on-line. In the event that a packet is received that specifies ordered routing on a lane of the Adaptive Set that has been taken off-line, then the packet will be routed on the next link of that Adaptive Set that is active (not off-line).

Thus, although Adaptive Sets are defined at the router nodes, the source controls the use of the Adaptive Set by setting the ACB bits. An important result of the use of Adaptive Sets is that packets may arrive at the destination out of order. For example, the receive FIFOs of ports coupled to some of the output ports forming a Adaptive Set may be full and not be accepting further packets (i.e., exerting back pressure). Packets routed to these lanes of the Adaptive Set will be delayed while packets routed to other lanes will be transmitted immediately. Thus, at the router, earlier received packets routed to a lane experiencing back pressure will be transmitted after later received packets routed to a lane not experiencing back pressure. Accordingly, the packets will not be transmitted in the order received.

In a preferred embodiment, a SEND transaction is implemented that requires strict ordering. This is necessary because the receiving node places the incoming packets into a scatter list. Each incoming packet goes to a destination determined by the sum total of bytes of the previous packets. The strict ordering of packets is necessary to preserve integrity of the entire block of data being transferred, because incoming packets are placed in consecutive locations within the block of data. For this transaction, the ACB bits in each packet header would specify the same lane of the Adaptive Set. Then, if a Adaptive Set has been defined in router, only a single link would be used, thereby assuring ordered transmission.

On the other hand, a remote direct memory access (RDMA) transaction does not require that packets be received in order. An RDMA packet contains the address to which the destination end node writes the packet contents. This allows multiple RDMA packets within an RDMA message to complete out of order. The contents of each packet are written to the correct place in the end node's memory, regardless of the order in which they complete. The RDMA may use adaptive routing if a Adaptive Set is defined by setting the ACB field to 100 (Unordered Packet Delivery, see FIG. 6).

Thus, if a Adaptive Set is defined in the router, the source can control whether routing is deterministic or adaptive through the use of the ACB bits in the destination field.

Error Recovery and Barrier Transactions

The ServerNet SAN recovers from errors by retransmitting packets previously transmitted subsequent to the occurrence of an error. As described above, packets that have been transmitted are stored in the receive and transmit FIFOs of the routers in the fabric. Thus, prior to retransmission it must be assured that these state packets, i.e., packets transmitted after the error occurred, are flushed from all the FIFOs. In the preferred embodiment, a path is flushed by performing a barrier transaction, which, in the most general form, is a write of a particular value to the remote end node on the path to be flushed followed by a read of the particular value from the remote node. Clearly, for each link, the barrier transaction packet will not reach the end node until all stale packets preceding the barrier transaction have reached the end node. The end node discards those packets received prior to the barrier transaction packet.

For deterministic routing the path is composed of serially connected links, so the barrier transaction necessarily flushes all stale packets. However, if routers have defined Adaptive Sets and adaptive routing is specified then stale packets may reside in all the parallel physical links which form the Adaptive Set.

The ACB offset bits allow the source to flush each lane of a Adaptive Set. By using the first four forced ordering encodings of the ACB all possible lanes of a Adaptive Set may be selected for routing a packet. By stepping through these four encodings (four being the maximum number of links in a Adaptive Set), all of the ports that a packet can traverse when going between two end nodes can be flushed. For software to flush out the path between two end nodes the following algorithm should be performed:

```
for i=0 to 3
    Write location (ACB field=i); /write portion of barrier
      operation
    Read location (ACB field=i); /read portion of barrier
      operation.
```

The index i is stepped from 0 to 3 because the maximum number of links that compose a Adaptive Set is 4. When performing this algorithm, the software does not need to know if there is a fat link in the routing network or the number of links composing the Adaptive Set. The flush is successful only if each read function returns the appropriate unique value for each i.

The forced ordering encodings of the ACB allow thorough diagnostics of Adaptive Set links, and allow each link of a pipe to be tested individually.

Fat Trees Utilizing Adaptive Links

Figure 11:
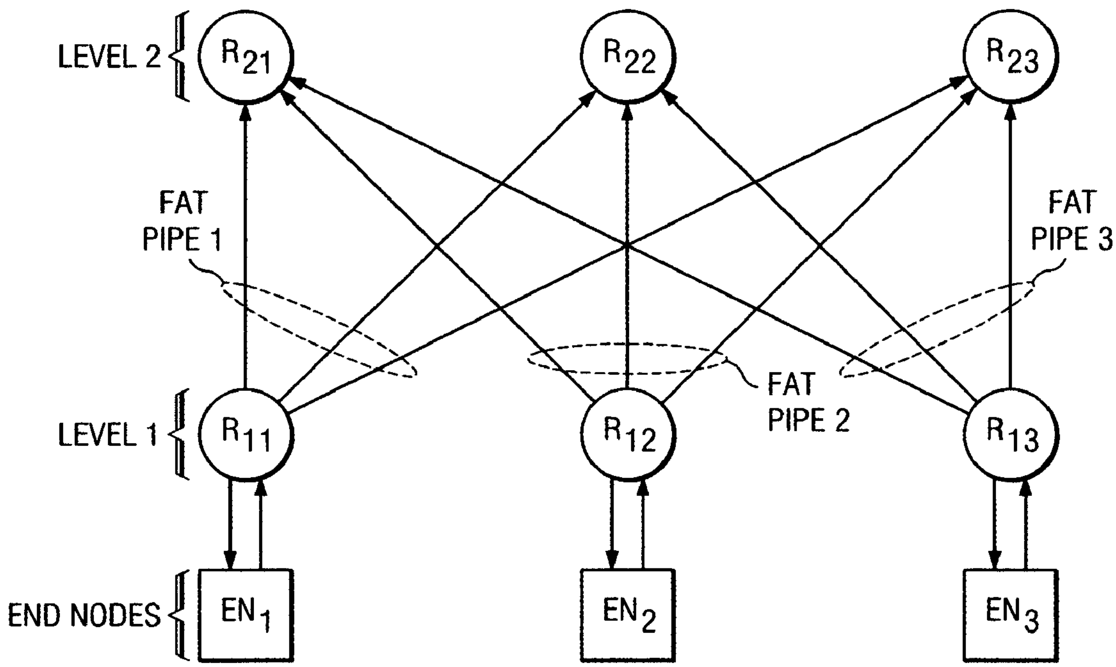
FIG. 11 is a schematic diagram depicting the use of adaptive sets as uplinks in a fat tree.
Figure 12:
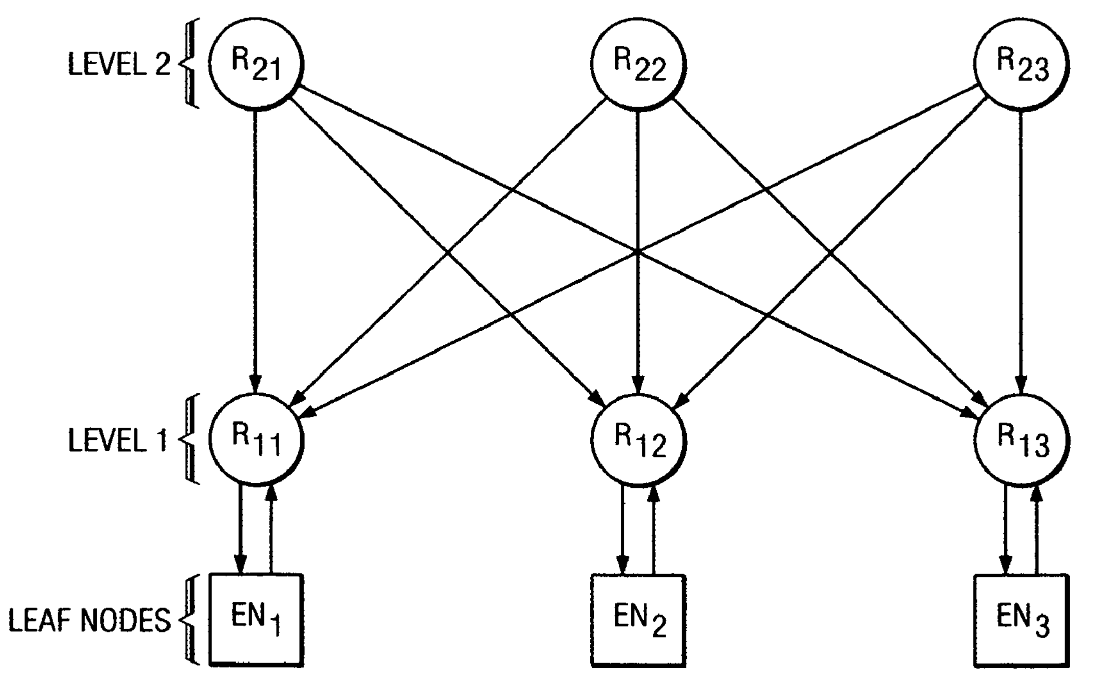
FIG. 12 is a schematic diagram depicting the downlinks in a fat tree.

A fat tree is a tree where the number of links is increased each layer above the leaf nodes. In the above, a Adaptive Set was defined as having all its links connected to the same node. However, the same implementation in the router also allows the links to be connected to different destination routers. FIGS. 11 and 12 depict a two-level fat tree having three routers in each level. The routers R11, R12, and R13 in level 1 are "leaf" routers connected to end nodes EN1, EN2, and EN3 by conventional links.

FIG. 11 depicts the up-links from level 1 to level 2. Each router in level 1 has three of its output up-links configured as a Adaptive Set. Each up-link in the Adaptive Set is connected to a different router of level 2. Thus, unlike the above-described embodiment, links in an adaptive set may be coupled to different routers.

FIG. 12 depicts the down links of the fat-tree. Each router in the upper level is connected to a router in the lower level by a single, deterministic down-link with no adaptivity supported.

The result of this configuration is for traffic from end nodes to be distributed adaptively to the upper level routers while progressing upwards in the fat tree, and then to get routed deterministically when traveling in the downward direction. Alternating traffic adaptively through the three Adaptive Set up links of each level 1 router gives much better average link utilization than if the upward links were selected statically based on destination ID. No matter how static partitioning is done, there is some traffic pattern that could cause all traffic to queue for a single link to the next level of the tree.

In larger topologies, multiple Adaptive Sets can be encountered on the way to the destination.

The invention has now been described with reference to the preferred embodiments. Alternatives and substitutions will now be apparent to persons of skill in the art. In particular, the adaptive sets are limited to any number of links or any particular configuration protocol. Further, fat trees may include an arbitrary level with adaptive links in different sets of uplinks between the levels. Accordingly, it is not intended to limit the invention except as provided by the appended claims.

What is claimed is:

1. In a system area network (SAN) including a source node and a destination node coupled by a network fabric, with the system for transferring data between the source node and the destination node, with the network fabric coupling the source and destination nodes including first and second routers having multiple input ports coupled to multiple output ports by a cross-bar switch, and with the SAN implementing data transfers as a sequence of request/response packet pair transactions, with each request and response packet containing a header including a destination field, and with the SAN for implementing ordered transactions requiring that packets be received in the order transmitted and unordered transactions where packets may be received out of order, a system for implementing adaptive sets of lanes between said first and second routers, said system comprising:

configuration logic at said first router for configuring an adaptive set including multiple lanes, with a the control logic associating a designated input port with the adaptive set and associating a unique output port with each lane of the adaptive set;

routing option control logic at said source node for setting adaptive control bits in said destination field to specify whether the packet could use the routing capabilities of the adaptive set or should be routed down a specific lane of the adaptive set;

routing control logic at said first router, responsive to the destination field of a packet received at said designated input port, for assigning a specific output port to said packet, and, if said specific output port is associated with said adaptive set, adaptively assigning a port associated with a lane in the adaptive set if the adaptive control bits specify adaptive routing or deterministically specifying said specific output port if said adaptive control bits specify determinist routing.

2. The system of claim 1 wherein:

said routing control logic includes a routing table with each entry in the table including a bit specifying whether the entry is for an adaptive set, and if so, a field identifying the adaptive set.

3. In a system area network (SAN) including a source node and a destination node coupled by a network fabric, with the system for transferring data between the source node and the destination node, with the network fabric coupling the source and destination nodes including a router having multiple input ports coupled to multiple output ports by a cross-bar switch, where the router may include an adaptive set of lanes coupled to an input port where a designated output port is assigned to each lane so that packets received at the input port may be adaptively routed on any one of the multiple output ports assigned to the lanes of the adaptive set, and with the SAN implementing data transfers as a sequence of request/response packet pairs, and with each request packet containing a header including a destination field, a method for flushing lanes in an adaptive set configured at said router, said method comprising performing a barrier transaction including the steps of:

at said source node, preparing a sequence of write packets with the destination field of each packet in the sequence having adaptive control bits specifying a different lane in an adaptive set;

at said source node, transmitting said sequence of write packets;

at said router, receiving said write packets, and, if an adaptive set is defined, responding to the adaptive control bits of each received write packet to force said packet to the output port specified by the adaptive control bits in the write packet.

4. The method of claim 3 further comprising the steps of:

at the source node, including a particular value in each of the write packets and specifying a particular location at the destination node;

at the destination node, for each write packet, storing said particular value at the specified location;

at the source node, accessing the particular locations at the destination node and if the particular value is read from the particular locations specified by the sequence of write packets indicating that the barrier transaction was successful.

5. The method of claim 3 further comprising the steps of:

at the router, limiting the number of lanes in an adaptive set to a specified number;

at the source node, forming a selected number of write packets in said sequence.

6. A routing topology comprising:

a first level including first first-level routers and second first-level routers, each first-level router having a first, second, and third input ports coupled to first, second, and third output ports by a cross-bar switch, and with each first-level router configured to include an adaptive set including first and second lanes, with the first input port associated with the adaptive set and a first output port associated with the first lane and a second output port associated with the second lane of the adaptive set, and with each first-level router including routing logic for adaptively assigning a lane in the adaptive set to adaptively route packets received at the first input port to first and second output ports associated with lanes of the adaptive set;

a second level of routers including first second-level routers and second second-level routers, each second-level router having first and second input ports coupled to first and second output ports by a cross-bar switch;

a first uplink coupling the first output port of the first first-level router to the first input port of the first second-level router;

a second uplink coupling the second output port of the first first-level router to the first input port of the second second-level router;

a third uplink coupling the first output port of the second first-level router to the second input port of the first second-level router;

a fourth uplink coupling the second output part of the second first-level router to the second input port of the second second-level router;

a source node coupled to the input port of said first first-level router; and a destination node coupled to the third output port of said second first-level router.

7. The routing topology of claim 6 further comprising:

a first downlink coupling the first output port of the first second-level router to the second input port of the first first-level router;

a second downlink coupling the second output port of the first second-level router to the second input port of the second first-level router;

a third downlink coupling the first output port of the second second-level router to the third input port of the first first-level router; and a fourth downlink coupling the second output port of the second second-level router to the third input port of the second first-level router.

* * * * *

UNITED STATES PATENT AND TRADEMARK OFFICE

CERTIFICATE OF CORRECTION

PATENT NO. : 6,950,428 B1
APPLICATION NO. : 09/670174
DATED : September 27, 2005
INVENTOR(S) : Robert W. Horst et al.

It is certified that error appears in the above-identified patent and that said Letters Patent is hereby corrected as shown below:

In column 4, line 49, after "ACB" delete "filed" and insert -- field --, therefor.

In column 5, line 62, delete "state" and insert -- stale --, therefor.

In column 7, line 30, in Claim 1, after "with" delete "a the" and insert -- a --, therefor.

Signed and Sealed this

Eighteenth Day of August, 2009

David J. Kappos
*Director of the United States Patent and Trademark Office*